March 3, 1964
R. G. OTTING ET AL 3,123,655
PROCESS FOR EXTRUDING HIGH IMPACT THERMOPLASTIC
ALKENYL AROMATIC RESINS
Filed June 26, 1961
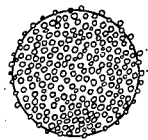
Graft copolymer particle having coated on its surface finely divided particles of low-molecular weight polystyrene
Fig. 2
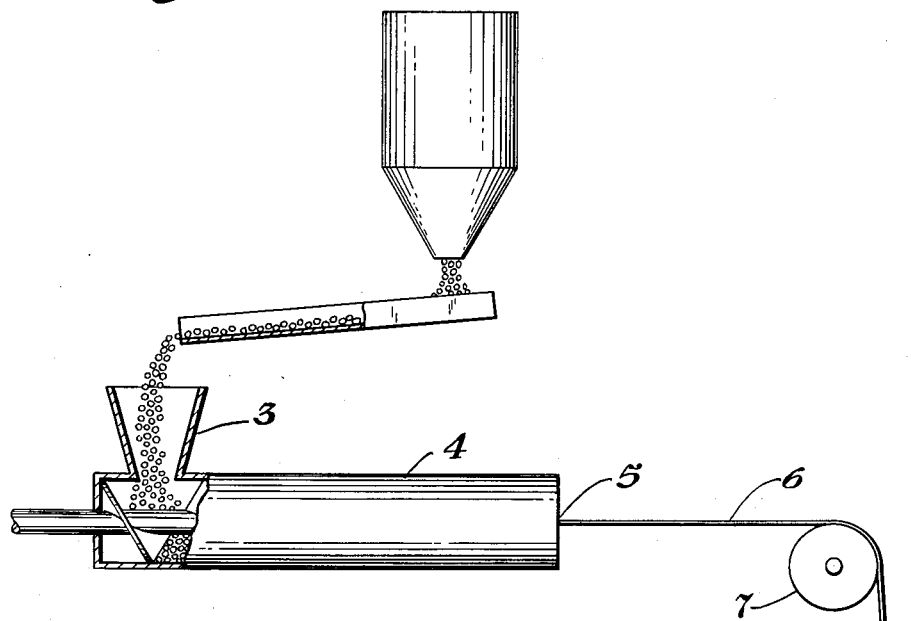
Fig. 1
INVENTORS
Robert G. Otting
James K. Rieke
Floyd B. Nagle
Henry J. Karam
Floyd M. Zimmerman
BY 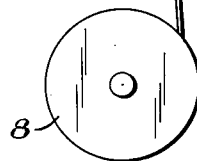
ATTORNEYS

United States Patent Office 3,123,655
Patented Mar. 3, 1964

3,123,655
PROCESS FOR EXTRUDING HIGH IMPACT THERMOPLASTIC ALKENYL AROMATIC RESINS
Robert G. Otting, James K. Rieke, Floyd B. Nagle, and Henry J. Karam, Midland, Mich., and Floyd M. Zimmerman, Torrance, Calif., assignors to The Dow Chemical Company, Midland, Mich., a corporation of Delaware
Filed June 26, 1961, Ser. No. 119,327
6 Claims. (Cl. 264—176)

This invention relates to the production of plastic articles from thermoplastic high-impact alkenyl aromatic resins by extrusion methods and pertains especially to a method of improving the rate of extrusion of such materials to form bubble-free shaped articles.

In fabricating high-impact thermoplastic alkenyl aromatic resins, e.g. copolymers of styrene with a small amount of natural or a synthetic rubber, by extrusion methods it has been observed that when the rate of extrusion is increased beyond a given rate for a particular apparatus that the extruded article is non-uniform, usually has a rough or pebbled surface and contains bubbles which appear to be caused by the entrapping of air or vapors of volatile materials in the extruded material. These difficulties can be overcome by lowering the rate of extrusion, but such procedure is disadvantageous because it adds to the cost of the extruded article.

It has now been discovered that the rate of extrusion of high-impact thermoplastic alkenyl aromatic resins, e.g. copolymers of monovinyl aromatic hydrocarbons of the benzene series such as styrene or vinyltoluene and from 2 to 10 percent of rubber chemically combined in the copolymer, can readily be increased to produce bubble-free extruded articles such as a sheet, bar, rod, strip or other shaped article by mixing with the high-impact alkenyl aromatic resin, suitably in granular form, a finely divided low-molecular weight homopolymer or copolymer of one or more monoalkenyl aromatic hydrocarbons of the benzene series having a single polymerizable vinyl or isopropenyl radical directly attached to a carbon atom of the aromatic nucleus, in an amount corresponding to from 0.05 to 1 percent by weight of the high-impact alkenyl aromatic resin, and thereafter extruding the mixture of materials into a desired shape.

It has further been found that it is advantageous to adhere the finely divided or powdered low-molecular weight homopolymer or copolymer of monoalkenyl aromatic hydrocarbons to surfaces of the granular high-impact alkenyl aromatic resin, since adhering the powdered low-molecular weight polymer to the granules provides more uniform distribution of the low-molecular weight polymer throughout a body of the granular material and avoids the occurrence of dusting such as usually occurs when the coated particles are fed to an extruder by means of a vibrating feeder or are conveyed by air.

The invention is described more particularly with reference to the drawing wherein, FIG. 1 is a diagrammatic sketch of a plastics extruder suitable for practice of the invention, and, FIG. 2 is an enlarged view of a granule or particle of the thermoplastic alkenyl aromatic resin comprising the graft copolymer having the surface of said particle coated with a finely divided low-molecular weight alkenyl aromatic resin, e.g. polystyrene.

Referring to FIG. 1 of the drawing, in carrying out the process, the thermoplastic alkenyl aromatic resin graft copolymer particles having coated uniformly or substantially uniformly on the surfaces thereof, the finely divided low-molecular weight alkenyl aromatic polymer, is fed to the hopper 3, of a plastics extruder 4, wherein it is pressed and heated to its softening temperature, e.g. to temperatures between 135° and 260° C., and is extruded through a die or discharge orifice 5 at temperatures between 180° and 260° C. in the form of a thin sheet 6, ribbon, rod, bar, or other form, then is cooled and cut to a desired length, or is passed over guide roll 7 onto windup roll 8.

The powdered or finely divided low-molecular weight polymer can be adhered to the high-impact alkenyl aromatic resin granules in usual ways such as by blending the granular high-impact resin with the desired amount of finely divided low-molecular weight polymer in a tumbler until the powder is uniformly distributed throughout the body of the granules and thereafter adding a small amount e.g. from 0.01 to 5 percent, of a liquid which swells or softens the low-molecular weight polymer such as petroleum ether boiling between about 80° and 210° C., or preferably a small amount of a liquid such as petroleum ether mixed with a similarly small proportion of a liquid polymer of a monoalkenyl aromatic hydrocarbon such as a liquid polystyrene or a liquid poly-alpha-methyl styrene, after which the resulting mixture is blended, then heated suitably in an air oven to temperatures between about 50° and 75° C. to remove residual solvent. The granular high-impact alkenyl aromatic resin having the finely divided low-molecular weight polymer firmly adhered to the surfaces as a non-dusting granular material are a preferred embodiment of the invention.

The high-impact thermoplastic alkenyl aromatic resin can be a copolymer of one or more monovinyl aromatic hydrocarbons of the benzene series such as styrene, vinyltoluene, vinylxylene, ethylvinylbenzene, isopropylstyrene, tert.-butylstyrene and the like and natural or a synthetic rubber such as rubbery copolymers of from 70 to 80 percent by weight of butadiene and from 30 to 20 percent of styrene, which alkenyl aromatic resin contains from 90 to 98 percent by weight of the monovinyl aromatic hydrocarbon in chemically combined form, or interpolymerized, with from 10 to 2 percent of the rubber.

The high-impact alkenyl aromatic resins can be prepared in usual ways, e.g. by dissolving or dispersing the rubber in the monomeric monovinyl aromatic hydrocarbon to form a solution or homogeneous dispersion and heating the solution in mass to polymerize the monomers.

The low molecular weight polymer can be a normally solid homopolymer or copolymer of one or more monoalkenyl aromatic hydrocarbons such as styrene, vinyltoluene, vinylxylene, isopropylstyrene, tert.-butylstyrene or alpha-methyl styrene which polymer has a molecular weight between about 10,000 and 50,000 as determined by the scattering of light. The low molecular weight polymer is preferably polystyrene having a molecular weight corresponding to a viscosity characteristic of from about 6 to 54 centipoises as determined for a 30 weight percent solution of the polystyrene in toluene at 25° C. The low-molecular weight polymer is used in the form of a fine powder, i.e. in the form of particles of sizes not greater than 20, preferably between 50 and 100, mesh per inch as determined by U.S. standard screens, and is employed as a dusting powder, i.e. it is blended with solid granules or particles of the high-impact alkenyl aromatic resin so as to coat the surface of the granules.

The coating of the low molecular weight polymer in the form of fine particles adhered to surfaces of the granules of the high-impact alkenyl aromatic resin has an action in the extruder of lubricating, plasticizing and facilitating extrusion of the heat-softened material, and of inhibiting or preventing the entrapment of air in the heat-softened mateiral so that the extrusion can be carried out at substantially faster rates to obtain plastic articles which are free from imperfections or bubbles.

In practice, a high-impact thermoplastic alkenyl aromatic resin such as a copolymer of about 95 percent by weight of styrene and about 5 per cent of a synthetic rubber, e.g. a rubbery copolymer of about 73.5 percent by weight of butadiene and about 26.5 percent of styrene, in the form of molding granules of sizes between 8 and 16 mesh per inch as determined by U.S. standard screens is dry-blended with from 0.05 to 1 percent by weight of a low molecular weight homopolymer or copolymer of one or more monoalkenyl aromatic hydrocarbons of the benzene series in the form of a fine powder, suitably a powder consisting of particles not greater than 20, preferably between 50 and 100, mesh per inch. The mixture of the materials is fed to a plastics extruder wherein it is heat softened and mechanically worked at temperatures between about 135° and 260° C. and is discharged through an orifice at temperatures between 180° and 260° C. The invention is advantageously employed in extruding high-impact thermoplastic alkenyl aromatic resins such as styrene-rubber copolymers in the form of bubble-free sheet suitable for making plastic articles, e.g. by vacuum forming, having a high impact strength.

The following examples illustrate ways in which the principle of the invention has been applied, but are not to be construed as limiting its scope.

EXAMPLE 1

In each of a series of experiments, a copolymer of 95 percent by weight of styrene and 5 percent of a rubbery copolymer of approximately 73.5 percent by weight of butadiene and 26.5 percent of styrene was fed to a plastics extruder in the form of discrete free-flowing particles. The material was heat-softened in the plastics extruder in zones maintained at about 135°, 200° C. and 205° C. as it progressed through the extruder under pressure of the forwarding screw and was discharged through a slotted die at a temperature of 215° C. in the form of a continuous sheet 1/16 inch thick. In carrying out the experiments the forwarding screw of the extruder was rotated at a rate of about 35 revolutions per minute such that the extruded sheet was free from bubbles, then was increased to a rate at which bubbles were observed in the extruded sheet. The rate of extrusion in pounds per hour of material at the revolutions per minute of the screw when bubbles are observed in the extruded sheet just exceeds the maximum rate of extrusion for a given material. The faster the r.p.m. of the screw, the greater is the rate of extrusion or the greater is the out-put of extruded product. In carrying out the experiments tests were made with the copolymer of 95 percent by weight styrene and 5 percent rubbery copolymer of butadiene and styrene, alone, in the form of granules of about 3 mesh per inch as determined by U.S. standard screens, and with granules of the copolymer which were intimately blended with a finely divided low molecular weight polystyrene having a viscosity characteristic of 18.5 centipoises as determined for a 30 weight percent solution of the polystyrene in toluene at 25° C., in amounts as stated in the following table, and which low molecular weight polystyrene was in the form of particles of sizes between 50 and 100 mesh per inch. The finely divided polystyrene was adhered to the surfaces of the styrene-rubber copolymer particles as a dusting powder. Table I identifies the experiments and gives the proportion of finely divided polystyrene in percent by weight of the styrene-rubber copolymer used. The table gives the speed of rotation of the forwarding screw in revolutions per minute and the rate of extrusion in pounds per hour of extruded material at which bubbles are observed in the extruded sheet. The practical rate of extrusion is that which produces an extruded sheet free from bubbles and is slightly lower than that where bubbles are observed.

*Table I*

| Run No. | Starting Materials | | | Product— Rate of Extrusion, lbs./hr. |
|---|---|---|---|---|
| | Rotation of Screw, r.p.m. | Finely Divided Polystyrene | Styrene-Rubber Copolymer, Parts | |
| 1 | 40 | None | 100 | 179 |
| 2 | 42 | 0.04 | 100 | 184 |
| 3 | 52 | 0.25 | 100 | 215 |
| 4 | 63 | 0.50 | 100 | 249 |

EXAMPLE 2

In each of two experiments, a copolymer of 95 percent by weight of styrene and 5 percent of a rubbery copolymer of approximately 73.5 percent by weight of butadiene and 26.5 percent of styrene was fed to a plastics extruder in the form of solid discrete free-flowing particles. The material was heat-softened in the plastics extruder in zones maintained at about 135° C., 200° C., and 205° C. as it progressed through the extruder under pressure of the forwarding screw and was discharged through a slotted die at a temperature of 215° C. in the form of a continuous sheet 1/16 inch thick. In carrying out the experiment the forwarding screw was rotated at rates of 40, 50 and 60 revolutions per minute, respectively, in each of three tests. The extruded sheet was observed for bubbles, "fish eyes" or gel particles and imperfections, and the rate of production per hour determined at the different screw speeds. In experiment A the feed material was the granular copolymer of 95 percent styrene and 5 percent rubbery copolymer. In experiment B the feed material was the granular copolymer of 95 percent styrene and 5 percent rubbery copolymer, which copolymer granules were intimately blended with 0.75 percent by weight of finely ground polystyrene of low molecular weight and in the form of particles of sizes between 50 and 100 mesh per inch, by mixing the granules of the copolymer and the powdered polystyrene in a tumbler mixer. The polystyrene employed in the experiment as a dusting powder had a molecular weight corresponding to a viscosity characteristic for the copolymer of 18.5 centipoises as determined for a 30 weight percent solution of the polystyrene in toluene at 25° C. Table II identifies the experiments and gives the rate of production of the extruded sheet.

*Table II*

| Test No. | Rotation of Screw in r.p.m. | Production of Sheet | | | |
|---|---|---|---|---|---|
| | | A | | B | |
| | | Rate, lbs./hr. | Bubbles in Sheet | Rate, lbs./hr. | Bubbles in Sheet |
| 1 | 40 | 175 | yes | 180 | no. |
| 2 | 50 | 208 | yes | 211 | no. |
| 3 | 60 | 235 | yes | 245 | no. |
| 4 | 62 | | | 260 | yes. |

EXAMPLE 3

(A) A charge of a copolymer of 95 percent by weight of styrene and 5 percent by weight of a rubbery copolymer of approximately 73.5 percent by weight of butadiene and 26.5 percent of styrene (GR–S 1006 synthetic rubber), prepared by dissolving the rubbery copolymer in monomeric styrene then heating the solution in mass to polymerize the monomer, which copolymer was in the form of granules of sizes between 8 and 10 mesh per inch as determined by U.S. standard screens, was placed in a double cone blender, together with 0.75 percent by weight of finely divided low molecular weight polystyrene having a viscosity characteristic of 17 centipoises as determined for a 30 weight percent solution of the polystyrene in toluene at 25° C., and which polystyrene had been pulverized in a hammermill to form particles of sizes finer than 80 mesh per inch as determined by U.S. standard screens. The resulting mixture was dry-blended for about 15 minutes. Thereafter, a liquid mixture of 0.09 percent by weight of petroleum ether (B.P. 105°–205° C.) and 0.09 percent of a viscous liquid low molecular weight homopolymer of alpha-methyl styrene having a viscosity between 700 and 1000 centipoises at 60° C., each based on the weight of the copolymer granules, was added to the dry mixture of powdered polymer and granules. The resulting mixture was blended at room temperature for a period of four hours, then was removed from the blender and heated in a warm air oven at a temperature of 60° C. for a period of 8 hours. The product was found to consist of the copolymer granules having the finely divided low molecular weight polystyrene firmly adhered to the surfaces of the granules, and was free from dusting. (B) The product prepared in part A above was, in each of a series of experiments, fed to a plastics extruder having a forwarding screw of 2.5 inches, 3.5 inches and 4.5 inches in diameter, respectively. The material was heat-softened in the plastics extruder in zones maintained at about 135°, 200° and 205° C. as it progressed through the extruder under pressure of the forwarding screw and was discharged through a slotted die at a temperature of about 215° C. in the form of a continuous sheet 1/16 inch thick.

In carrying out the experiments the forwarding screw of each of the extruders was rotated at a rate of about 35 revolutions per minute such that the extruded sheet was free from bubbles, then was increased to a rate at which bubbles were observed in the extruded sheet. The rate of extrusion in pounds per hour of material at the revolutions per minute of the screw when bubbles are observed in the extruded sheet just exceeds the maximum rate of extrusion for a given material. The faster the r.p.m. of the screw, the greater is the rate of extrusion or the greater is the out-put of extruded product. In carrying out the experiments tests were made with the copolymer of 95 percent by weight styrene and 5 percent rubbery copolymer of butadiene and styrene, alone, in the form of granules of about 8 mesh per inch as determined by U.S. standard screens, and with granules of the copolymer which were intimately blended with the finely divided low molecular weight polystyrene having a viscosity characteristic of 17 centipoises as determined for a 30 weight percent solution of the polystyrene in toluene at 25° C. and which low molecular weight polystyrene was in the form of particles of sizes finer than 80 mesh per inch, and was adhered as non-dusting powder to the granular polymer with the low molecular weight alpha-methyl styrene polymer. Table III identifies the experiments and gives the proportion of finely divided polystyrene in percent by weight of the styrene-rubber copolymer used. The table gives the rate of extrusion in pounds per hour of extruded material at which bubbles are observed in the extruded sheet. The practical rate of extrusion is that which produces an extruded sheet free from bubbles and is slightly lower than that where bubbles are observed.

Table III

| Run. No. | Starting Materials | | | Product |
|---|---|---|---|---|
| | Diameter of Screw, Inches | Finely Divided Polystyrene, Percent | Styrene-Rubber Copolymer, parts | Rate of Extrusion, lbs./hr. |
| 1 | 2.5 | none | 100 | 95 |
| 2 | 2.5 | 0.75 | 100 | 109 |
| 3 | 3.5 | none | 100 | 168 |
| 4 | 3.5 | 0.75 | 100 | 240 |
| 5 | 4.5 | none | 100 | 390 |
| 6 | 4.5 | 0.75 | 100 | 548 |

We claim:

1. In a process for making a shaped plastic article wherein a thermoplastic alkenyl aromatic resin consisting essentially of a normally solid resinous graft copolymer of from 90 to 98 percent by weight of a monoalkenyl aromatic hydrocarbon of the benzene series and from 10 to 2 percent of a rubbery copolymer containing in chemically combined form from 70 to 80 percent by weight of butadiene and from 30 to 20 percent by weight of styrene is fed to a plastics extruder in the form of discrete particles of sizes not greater than about 8 mesh per inch as determined by U.S. standard screens wherein it is heat-plastified at temperatures between 135° and 260° C. under pressure and is extruded in the form of a body having a predetermined shape at temperatures between 180° and 260° C., the improvement which consists in blending with the feed of said thermoplastic alkenyl aromatic resin particles so as to coat the surfaces thereof, from 0.05 to 1 percent by weight of a normally solid polymerized monoalkenyl aromatic hydrocarbon of the benzene series having a single polymerizable group selected from the group consisting of the vinyl and the isopropenyl radicals directly attached to a carbon atom of the benzene nucleus, having a molecular weight between 10,000 and 50,000 and in the form of finely divided particles of sizes not greater than 20 mesh per inch as determined by U.S. standard screens.

2. A method as claimed in claim 1, wherein the thermoplastic alkenyl aromatic resin is a graft copolymer of from 90 to 98 percent by weight of styrene and from 10 to 2 percent of a rubbery copolymer containing in chemically combined form from 70 to 80 percent by weight of butadiene and from 30 to 20 percent of styrene and the added polymer is polystyrene.

3. A method of making sheet material which comprises feeding a normally solid resinous graft copolymer of from 90 to 98 percent by weight of styrene and from 10 to 2 percent of a rubbery copolymer containing in chemically combined form from 70 to 80 percent by weight of butadiene and from 30 to 20 percent of styrene, in the form of discrete particles of sizes not greater than about 8 mesh per inch as determined by U.S. standard screens, having adhered to surfaces of said particles from 0.05 to 1 percent by weight of a polystyrene having a molecular weight between 10,000 and 50,000, and in the form of finely divided particles of sizes not greater than about 20 mesh per inch as determined by U.S. standard screens, to a plastics extruder wherein the materials are heat-plastified at temperatures between 135° and 260° C. under pressure and extruding the resulting plastic mass at temperatures between 180° and 260° C. in the form of a continuous sheet.

4. A composition of matter comprising a thermoplastic alkenyl aromatic resin consisting essentially of a normally solid resinous graft copolymer of from 90 to 98 percent by weight of a monoalkenyl aromatic hydrocarbon of the benzene series and from 10 to 2 percent of a rubbery copolymer containing in chemically combined form from 70 to 80 percent by weight of butadiene and from 30 to 20 percent by weight of styrene, in the form of discrete particles of sizes not greater than about 8 mesh per inch as determined by U.S. standard screens, having coated on the surface of said graft copolymer particles from 0.05 to 1 percent by weight of a normally solid polymerized monoalkenyl aromatic hydrocarbon of the benzene series having a single polymerizable group selected from the group consisting of the vinyl and the isopropenyl radicals directly attached to a carbon atom of the benzene nucleus, having a molecular weight between 10,000 and 50,000, and in the form of finely divided particles of sizes not greater than 20 mesh per inch as determined by U.S. standard screens.

5. A composition as claimed in claim 4, wherein the thermoplastic alkenyl aromatic resin is a graft copolymer of from 90 to 98 percent by weight of styrene and from 10 to 2 percent of a rubbery copolymer containing in chemically combined form from 70 to 80 percent by weight of butadiene and from 30 to 20 percent of styrene, having coated on the surfaces of said graft copolymer particles finely divided polystyrene.

6. A composition as claimed in claim 4, wherein the thermoplastic alkenyl aromatic resin is a graft copolymer of from 90 to 98 percent by weight of styrene and from 10 to 2 percent of a rubbery copolymer containing in chemically combined form from 70 to 80 percent by weight of butadiene and from 30 to 20 percent of styrene, having adhered to the surfaces of said graft copolymer particles finely divided polystyrene.

References Cited in the file of this patent

UNITED STATES PATENTS

| | | |
|---|---|---|
| 2,494,588 | Skooglund | Jan. 7, 1950 |
| 2,540,146 | Stober | Feb. 6, 1951 |
| 2,991,508 | Fields et al. | July 11, 1951 |
| 2,838,801 | Dehong et al. | June 17, 1958 |
| 2,839,422 | Beyer et al. | June 17, 1958 |
| 2,972,593 | Daly | Feb. 21, 1961 |
| 3,012,282 | Donald | Dec. 12, 1961 |